Aug. 6, 1929.  G. PALTZER  1,723,880
DELIVERY MECHANISM FOR SALT PANS AND THE LIKE
Filed Aug. 29, 1927  2 Sheets-Sheet 1

Inventor:
G. Paltzer.

Aug. 6, 1929.  G. PALTZER  1,723,880
DELIVERY MECHANISM FOR SALT PANS AND THE LIKE
Filed Aug. 29, 1927  2 Sheets-Sheet 2

Patented Aug. 6, 1929.

1,723,880

UNITED STATES PATENT OFFICE.

GEORG PALTZER, OF BASEL, SWITZERLAND, ASSIGNOR TO THE FIRM VEREINIGTE SCHWEIZERISCHE RHEINSALINEN, OF SCHWEIZERHALLE, NEAR BASEL, SWITZERLAND.

DELIVERY MECHANISM FOR SALT PANS AND THE LIKE.

Application filed August 29, 1927, Serial No. 216,315, and in Switzerland September 15, 1926.

This invention relates to delivery mechanism for salt or evaporating pans with reciprocating scrapers, which are raised for the return or inoperative movement.

In the known constructions of pans of this type, the reciprocating movement of the scraper is effected by cable or chain drive, which depends on the use of complicated control mechanism for the forward and backward movement of the scrapers and also disadvantageously affects the efficiency of the apparatus.

According to the invention, for the purpose of simplifying the drive, I arrange for effecting the reciprocating motion of the scraper by means of a carriage movable forwards and backwards in such a manner that one and the same hollow shaft, which carries the free scrapers and a lifting device serving to raise them for the return movement, is at the same time adapted for the axial housing of a rotating, electrically driven driving shaft, which effects, in a known manner, by its rotation, the forward and backward movement of the scraper carriage on lateral guide rails.

The accompanying drawing illustrates one form of construction embodying the invention and having electric motors for controlling the different movements.

In the said drawing—

Figure 3:
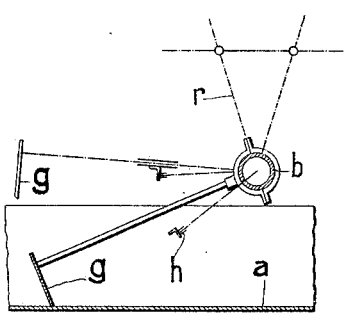
Figure 3 is a cross-section through the hollow shaft with the free scrapers and the lifting device shown diagrammatically.
Figures 4, 5:
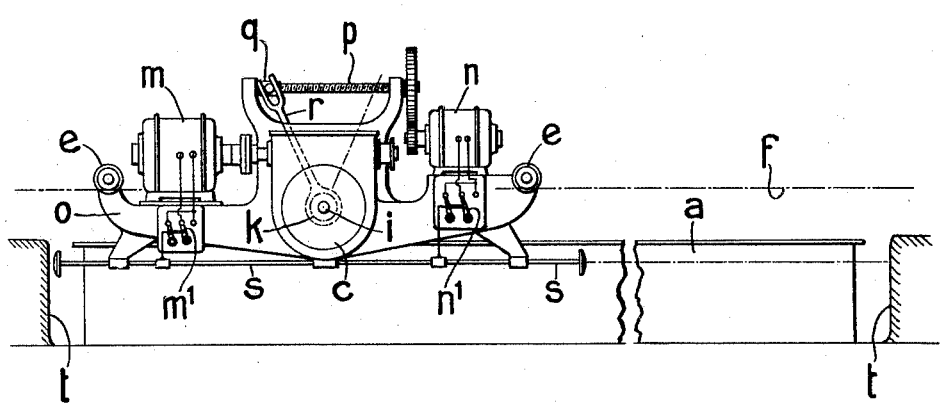
Figure 4 shows a reversing switch arrangement for said electric motors.
Figure 5 represents a detail.

Transversely across the salt pan $a$ there extends a horizontal hollow shaft $b$ which is guided at its ends by means of the bearing members $c$ and $d$ and the rollers $e$ along parallel lateral guide rails $f$ and together with the members $c$, $d$ forms a travelling forward and backward moving carriage. On the shaft $b$ are arranged side by side the scrapers $g$, freely rotatable thereon, the number thereof varying according to the breadth of the pan, and being distributed over the said breadth, in such a manner that their ends overlap one another. On the working stroke, the free scrapers $g$ bearing on the material in the pan, scrape the salt crystals in the known manner; for the return movement, the scrapers $g$ are raised, in the manner shown diagrammatically in Figure 3, by a lifter $h$, which is secured on the shaft $b$, as shown in Figure 5 so that they can be returned inoperatively to the initial position of the working stroke.

The hollow shaft $b$ serves, at the same time, for carrying a driving shaft $i$ extending axially through it. This is provided at its ends with toothed wheels $k$ which engage in rack teeth provided on the underside of the guide rails $f$. By rotating the driving shaft $i$, the aforesaid carriage is driven forwards and backwards with the scrapers on the rails $f$.

Figure 1:
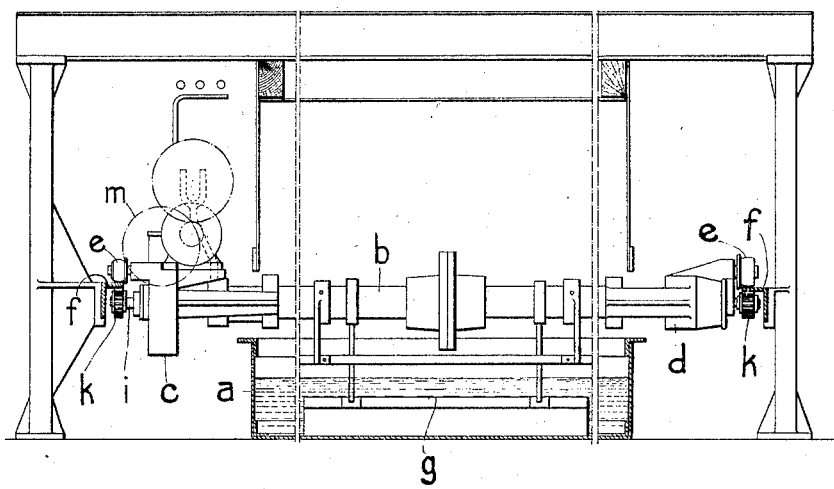
Figure 1 is a vertical part section, in which certain intermediate parts of a salt pan and the scraper carriage are broken away.
Figure 2:
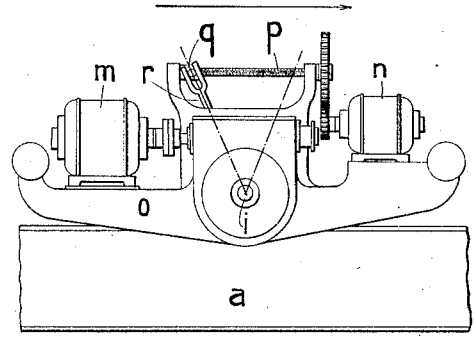
Figure 2 shows the driving side of the scraper carriage.

The drive of the shaft $i$ is effected by an electro-motor $m$ by means of a worm gear. These parts are mounted on a side cheek $o$ (Figure 2) of the carriage. This side cheek carries also an electro-motor $n$, which, by means of a screw-spindle $p$, actuates a carrier sleeve $q$ which, by means of the lever-arm $r$ rotates the hollow shaft $b$ with the lifter $h$ through an angle necessary for raising the loosely movable scrapers. At the ends of the carriage path the rotation of the electro-motors is reversed in the known manner by means of an automatically operated limit switch arrangement controlling the circuit of the motors. This switch arrangement is for example shown in Figure 4, wherein the two electric motors $m$, $n$ are combined respectively with reversing switches $m^1$, $n^1$, the movable members of which are coupled to a reversing rod $s$ carried by the carriage and adapted to strike alternately against stops $t$ at the ends of the carriage stroke to produce, by means of said switches, reversal of the rotation of the motors $m$, $n$ and to thus cause the reverse movement of the carriage as well as the raising or lowering of the scrapers $g$ as the case may be.

What I claim is:—

1. In a delivery mechanism for salt pans and the like, a transverse hollow shaft, a scraper arranged thereon, a lifter for lifting the scraper out of operative position, supporting members for said shaft to form therewith a travelling carriage, a guide-way for this carriage, a rotary driving shaft extending axially through said hollow shaft, gear members connected to said driving shaft to cause travelling of said carriage along its guide-way, an electromotor mounted on said carriage for rotating said driving shaft and means arranged on said carriage to actuate the aforesaid lifter.

2. In a delivery mechanism for salt pans and the like, a transverse hollow shaft, a scraper loosely arranged thereon, a lifter secured on said shaft for lifting the scraper out of operative position, supporting members for said shaft to form therewith a travelling carriage, a guide-way for this carriage, a rotary driving shaft extending axially through said hollow shaft, gear members connected to said driving shaft to cause travelling of said carriage along its guide-way, an electromotor mounted on said carriage for rotating said driving shaft and means to rotate said hollow shaft in order to actuate the aforesaid lifter.

3. In a delivery mechanism for salt pans and the like, a transverse hollow shaft, a scraper arranged thereon, a lifter for lifting the scraper out of operative position, supporting members for said shaft to form therewith a travelling carriage, a guide-way for this carriage, a rotary driving shaft extending axially through said hollow shaft, toothed wheels carried by said driving shaft and rack teeth on said guide-way engaged by said toothed wheels to produce travelling of said carriage along its guide-way, an electromotor mounted on said carriage for rotating said driving shaft and means arranged on said carriage to actuate the aforesaid lifter.

In witness whereof I have hereunto signed my name this 17th day of August, 1927.

GEORG PALTZER.